(12) United States Patent
Schroeder

(10) Patent No.: US 9,764,930 B2
(45) Date of Patent: Sep. 19, 2017

(54) MULTI-PURPOSE EMERGENCY SERVICES STRAP

(71) Applicant: Mark Schroeder, Cincinnatus, NY (US)

(72) Inventor: Mark Schroeder, Cincinnatus, NY (US)

(\*) Notice: Subject to any disclaimer, the term of this patent is extended or adjusted under 35 U.S.C. 154(b) by 0 days.

(21) Appl. No.: 15/132,872

(22) Filed: Apr. 19, 2016

(65) Prior Publication Data

US 2016/0311661 A1    Oct. 27, 2016

Related U.S. Application Data

(60) Provisional application No. 62/153,142, filed on Apr. 27, 2015.

(51) Int. Cl.
*A61G 1/00* (2006.01)
*B66C 1/18* (2006.01)
*A01K 1/02* (2006.01)

(52) U.S. Cl.
CPC .............. *B66C 1/18* (2013.01); *A01K 1/0263* (2013.01)

(58) Field of Classification Search
CPC ................................ B66C 1/18; A01K 1/0263
See application file for complete search history.

(56) References Cited

U.S. PATENT DOCUMENTS

| | | | |
|---|---|---|---|
| 3,275,205 A | 9/1966 | Howd et al. |
| 5,263,495 A | 11/1993 | Butterfield |
| 5,688,011 A | 11/1997 | Gulley |
| 5,896,859 A | 4/1999 | Carroll |
| 6,311,346 B1 | 11/2001 | Goldman |
| 6,671,899 B1 | 1/2004 | Oja |
| 6,715,167 B2 | 4/2004 | Wake |
| 6,908,131 B2 | 6/2005 | Main et al. |
| D559,467 S | 1/2008 | Petzl |
| 7,624,458 B2 | 12/2009 | Felling |
| 8,214,950 B2 | 7/2012 | Topaz et al. |
| 8,250,685 B1 | 8/2012 | Kocet |
| 8,281,430 B1 | 10/2012 | Hough et al. |
| 8,321,972 B1 | 12/2012 | Vetter |
| 8,336,141 B2 | 12/2012 | Wong |
| 2007/0131726 A1 | 6/2007 | Aliev |
| 2009/0178194 A1 | 7/2009 | Story |
| 2013/0254987 A1 | 10/2013 | Brannstrom |
| 2015/0021118 A1 | 1/2015 | Doty |

*Primary Examiner* — Stephen Vu
(74) *Attorney, Agent, or Firm* — Harris Beach PLLC

(57) ABSTRACT

A multi-purpose emergency services strap for facilitating lifting, transporting or carrying an individual has a strap body with a plurality of independent loops formed in the strap body. The independent loops include at least two adjacent, proximal leg loops formed in the strap body on either side of the midline, end loops on each end of the multi-purpose emergency services strap, and a plurality of adjacent handles formed in the strap body positioned distal to each of the at least two adjacent, leg loops and proximal to the end loops. The multi-purpose emergency services strap also includes a back strap and attachment loops that can be variously configured for many rescue and transport applications for humans and animals.

12 Claims, 12 Drawing Sheets

MULTI-PURPOSE EMERGENCY SERVICES STRAP

CROSS-REFERENCE TO RELATED APPLICATIONS

This application claims priority to and the benefit of co-pending U.S. provisional patent application Ser. No. 62/153,142, entitled Multi-Purpose Emergency Services Strap, filed Apr. 27, 2015, which is incorporated herein by reference in its entirety.

1. TECHNICAL FIELD

The present invention relates to devices used for facilitating lifting, transporting or carrying an injured or incapacitated person or a person of interest for any reason that may be warranted by emergency services or assistance. The present invention more particularly relates to a non-mechanized strap used to transfer an injured or incapacitated person.

2. BACKGROUND OF THE INVENTION

Emergency personnel such as firefighters are often required to lift and transfer an incapacitated person from a dangerous or hard-to-access location where there is little room to maneuver. Lifting an incapacitated person who has, for example, fallen or become unconscious, can be very difficult, physically awkward and dangerous. Emergency personnel are required to lift people that have fallen or become unconscious in any number of situations, including in burning buildings, or outdoors, such as while hiking, climbing or doing other outdoor activities. These situations, may pose even greater challenges and danger. A person that has fallen may be of any size, and in some cases are very large. It is inconvenient and costly for emergency personnel to carry support devices that come in various sizes to fit people of various sizes. In addition, it may delay the rescue of a person if a support device of the wrong size is initially selected.

Citation or identification of any reference in Section 2, or in any other section of this application, shall not be considered an admission that such reference is available as prior art to the present invention.

3. SUMMARY OF THE INVENTION

A multi-purpose emergency services strap for facilitating lifting, transporting or carrying an individual of interest is provided, comprising a strap body, wherein the strap body comprises:
  (a) at least two substantially inelastic, elongated strap portions of flexible, fabric-like, high-strength material, each strap portion comprising a first end, a second end opposite the first end, a strap running axis, a first edge running parallel to the running axis and a second edge running parallel to the running axis, wherein the at least two substantially inelastic, elongated strap portions are stitched together to form the strap body;
  (b) a midline; and
  (c) a plurality of independent loops, wherein:
    (i) each independent loop of the plurality is formed in the strap body by the at least two strap portions,
    (ii) opposed portions of each formed independent loop of the plurality are stitched together at a first point of formation on the strap body and at a second point of formation on the strap body opposite the first point of formation,
    (iii) the plurality of independent loops comprises:
      (a) at least two adjacent, leg loops formed in the strap body, wherein at least one of the at least two leg loops is positioned adjacent to the midline on a first side of the strap body, and at least one of the two leg loops is positioned adjacent to the midline on a second side opposite the first side of the strap body, and
      (b) a plurality of adjacent handles formed in the strap body positioned distal to each of the at least two adjacent, leg loops.

In one embodiment, the multi-purpose emergency services strap further comprises an end loop positioned at the first end and/or the second end.

In another embodiment of the multi-purpose emergency services strap, the at least two leg loops are capable of encircling, holding or lifting the legs of the individual.

In another embodiment of the multi-purpose emergency services strap, the individual of interest is an injured or incapacitated person. In another embodiment, the individual of interest is an injured or incapacitated animal.

In another embodiment of the multi-purpose emergency services strap, the at least two substantially inelastic, elongated strap portions are portions of one strap and wherein an end of each strap body portion is folded back and stitched to form the strap body portion therebetween.

In another embodiment, the multi-purpose emergency services strap further comprises at least one attachment loop. In another embodiment, the multi-purpose emergency services strap further comprises at least one pair of attachment loops. In another embodiment, the attachment loop or pair of loops is positioned at a point of formation of a handle.

In another embodiment of the multi-purpose emergency services strap, the attachment loops can be used for attaching a ring, D-ring, clip or carabiner.

In another embodiment, the multi-purpose emergency services strap comprises 3 pairs of attachment loops on either side of the midline, wherein each pair is positioned at a point of formation of a handle.

In another embodiment of the multi-purpose emergency services strap, each member of the pair of the at least one pair of attachment loops is positioned opposite the other member of the pair at the point of formation of the handle.

In another embodiment of the multi-purpose emergency services strap, each pair of attachment loops has a corresponding opposite pair that is positioned at a corresponding position (distance) from the opposite side of the midline.

In another embodiment, the multi-purpose emergency services strap further comprises a ring, D-ring, clip or carabiner attached to one of the attachment loops.

In another embodiment, the multi-purpose emergency services strap further comprises an attachment loop for a ring, D-ring, clip or carabiner positioned at a point of formation of a second handle adjacent to the first handle.

In another embodiment, the multi-purpose emergency services strap further comprises an independent back strap. In an embodiment, the back strap comprises:
a first end of the back strap, wherein the first end of the back strap comprises a first end loop or fastening point of the back strap;
a second end of the back strap, wherein the second end of the back strap comprises a second end loop or fastening point of the back strap; and
a back strap body portion therebetween.

In another embodiment of the multi-purpose emergency services strap, the first end of the back strap and/or the second end of the back strap is folded back on the back strap and stitched to the back strap to form the first end loop of the back strap and/or the second end loop of the back strap.

In another embodiment of the multi-purpose emergency services strap, at least one of the first and second end loops of the back strap comprises an attached ring, D-ring, clip or carabiner.

A method for transporting (or moving or lifting) a human or animal in need of transporting (or moving or lifting) is also provided. In an embodiment, the method comprises: providing the multi-purpose emergency services strap; placing the legs or hind limbs of the human or animal in the leg loops; fastening a ring, D-ring, clip or carabiner to two attachment loops across the ventral (belly or front portion) of the human or animal; positioning the back strap across the dorsal or back portion of the human or animal; and fastening the back strap to two attachment loops, thereby supporting the back or spine of the human or animal.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated, enlarged, exploded, or incomplete to facilitate an understanding of the invention.

FIGS. 1A-1B show an exemplary embodiment of a multi-purpose emergency services strap. In the embodiment shown in FIG. 1A (front view), there are 17 handles and 3 pairs of attachment loops distal to each leg loop, which are positioned between the leg loop and the end loop on that side. FIG. 1B shows a front view of the multi-purpose emergency services strap shown in FIG. 1A, with surface shading to show the character and contour of all surfaces of the three-dimensional aspects of the design.

FIG. 2 is a left side view of the embodiment of the multi-purpose emergency services strap shown in FIGS. 1A-1B. This view shows the back strap and carabiner clipped to attachment loops. The right side view (not shown) of this embodiment would be a mirror image of this view.

FIG. 3 is a diagram depicting the use of an embodiment of the multi-purpose emergency services strap for an emergency rescue of a person. The legs of the person to be rescued are placed through the leg loops of the multi-purpose emergency services strap. A carabiner is clipped into one attachment loop and then clipped into an opposite attachment loop to secure the multi-purpose emergency services strap in place. The back strap is clipped across the back of the individual and clipped into more distally positioned attachment loops (with respect to the midline of the multi-purpose emergency services strap).

Figure 7:
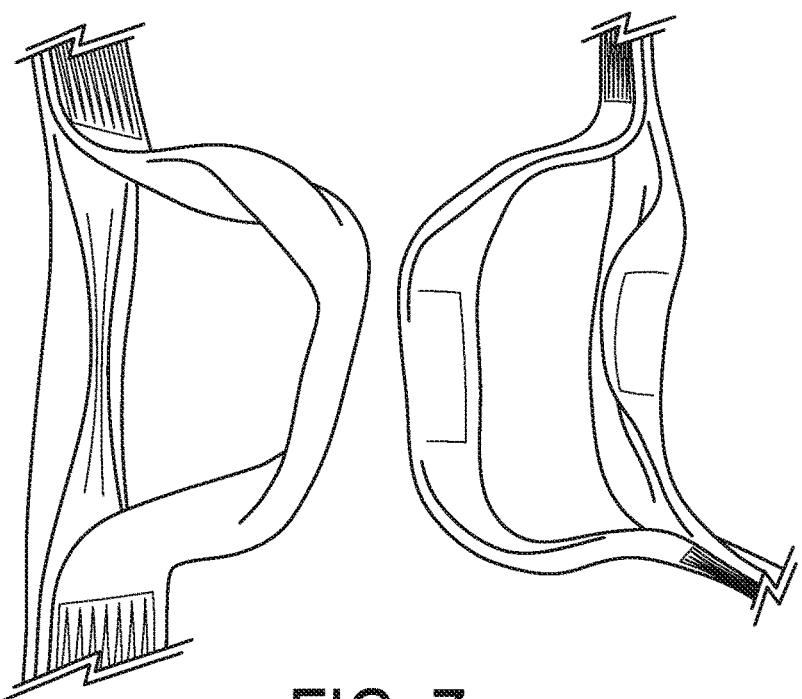
Figure 8:
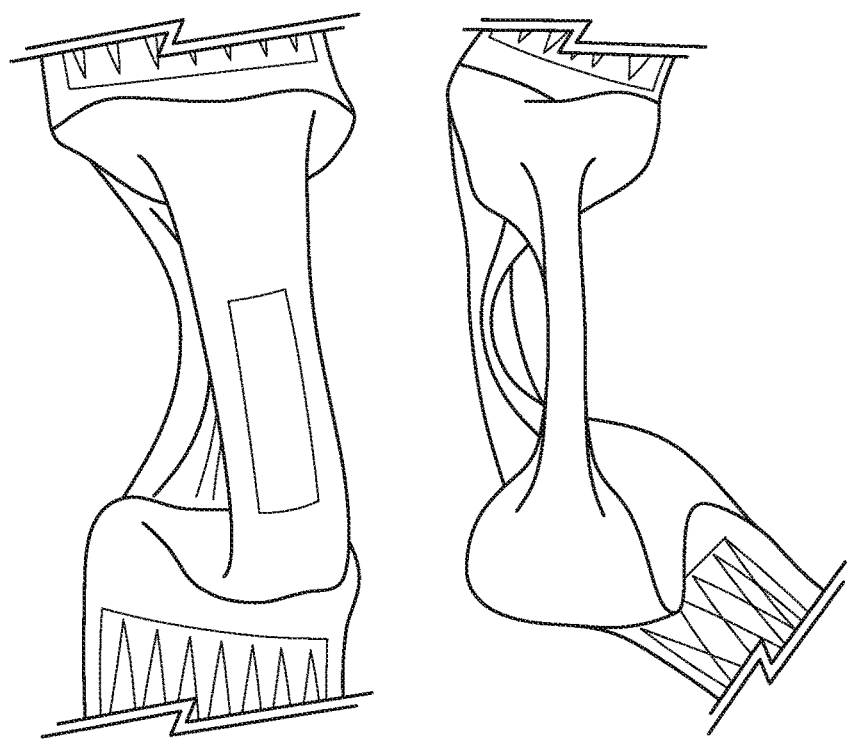

FIGS. 7 and 8 show two enlarged views of handles of two embodiments of the multi-purpose emergency services strap. The handle on the left side of each photo is made of webbing that is triple-folded over ("tripled over") and sewn. The handle on the right side of each photo is made of webbing that is double-folded over ("doubled over") and sewn. In these embodiment, the handle has one side longer ("long side") than the other side ("short side"). The long side of the handle is about 10 inches long and short side of the handle is about 6 inches long in these embodiments. About two inches of stitching is between the handles. These handles form approximately 6 inch by approximately 2 inch rectangles for 2-inch wide or 3-inch wide webbing.

Figure 9:
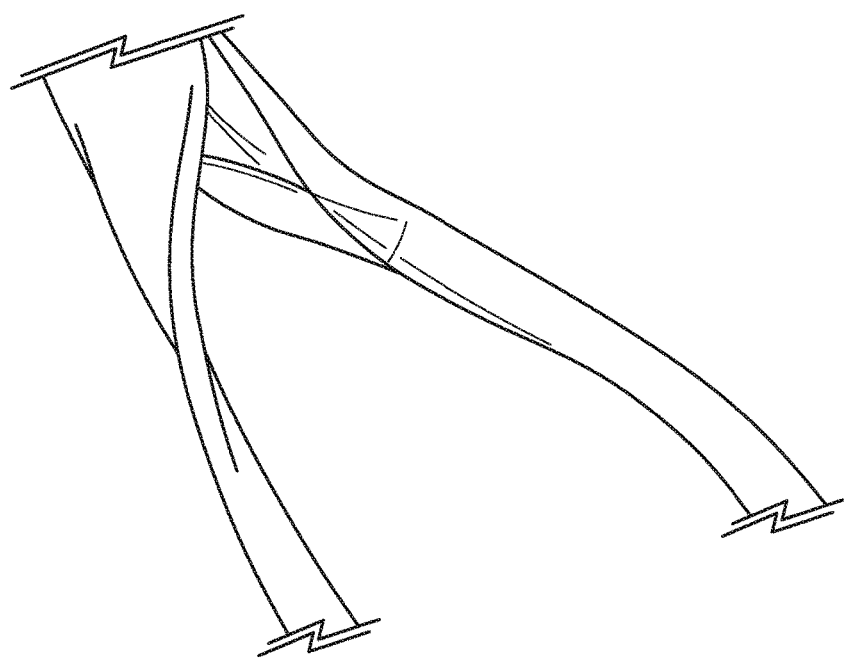

FIG. 9 shows an enlarged view of a leg loop. In this embodiment, the webbing is sewn flat so that the leg loops remain open and will not flatten.

Figure 10:
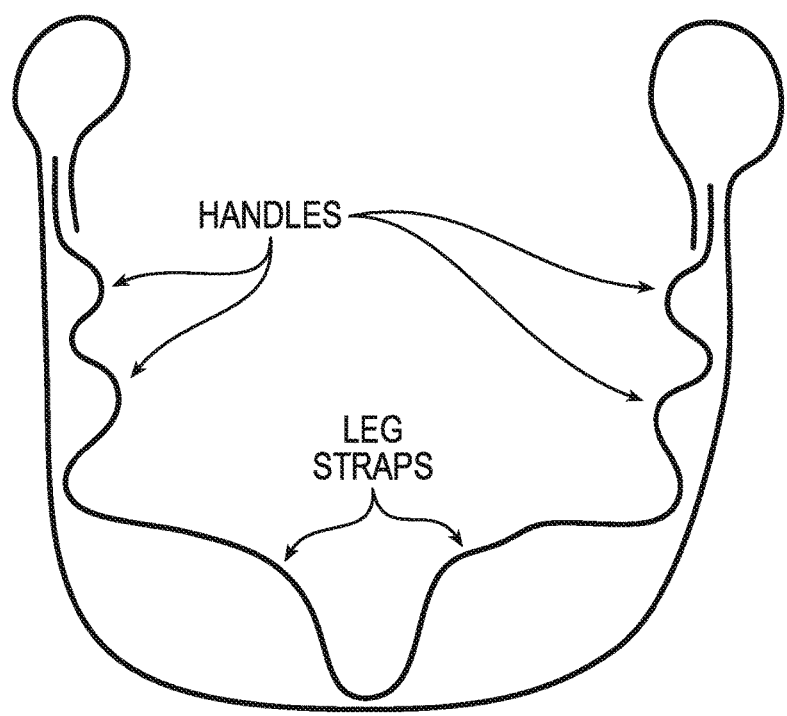
Figure 11:
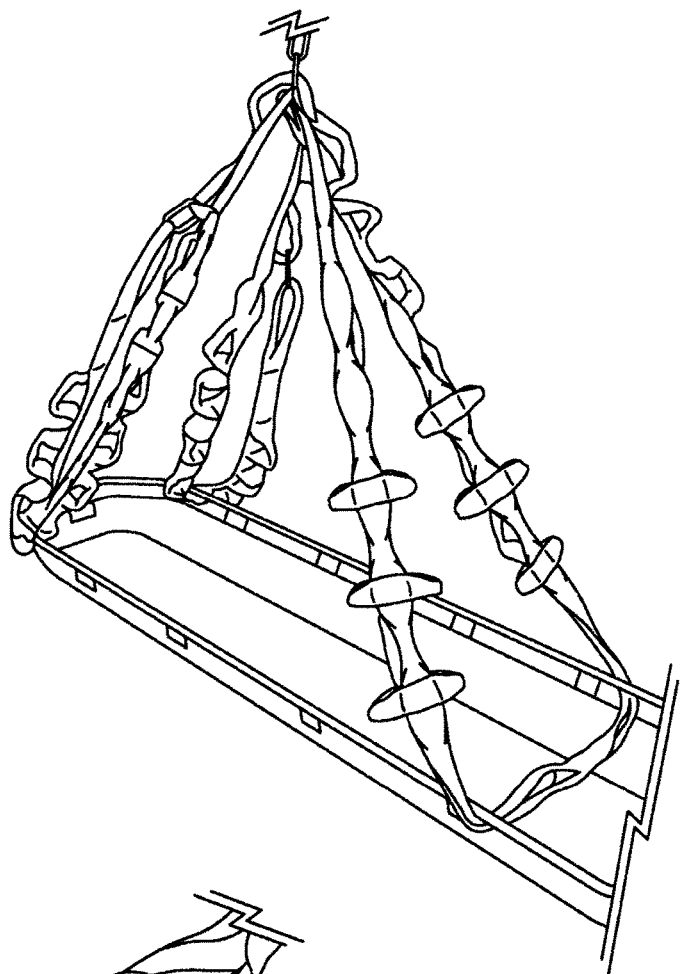

FIG. 10 shows a construction plan for sewing two pieces of webbing to form an embodiment of the multi-purpose emergency services strap. In this embodiment, the piece of webbing that forms the short side of each handle is doubled over at the ends to form end loops and are connected (e.g., stitched) to the second piece of webbing that forms the long side of the handles. "Leg straps"=leg loops FIG. 11 shows the multi-purpose emergency services strap inserted through splines at the head and the foot of a rescue basket. The end loops are routed through the front corners of the basket and back to the strap handles. The strap is then inserted through a carabiner that is being used to lift the rescue basket. The strap is clipped in place and the basket is ready to be lifted.

Figure 12:
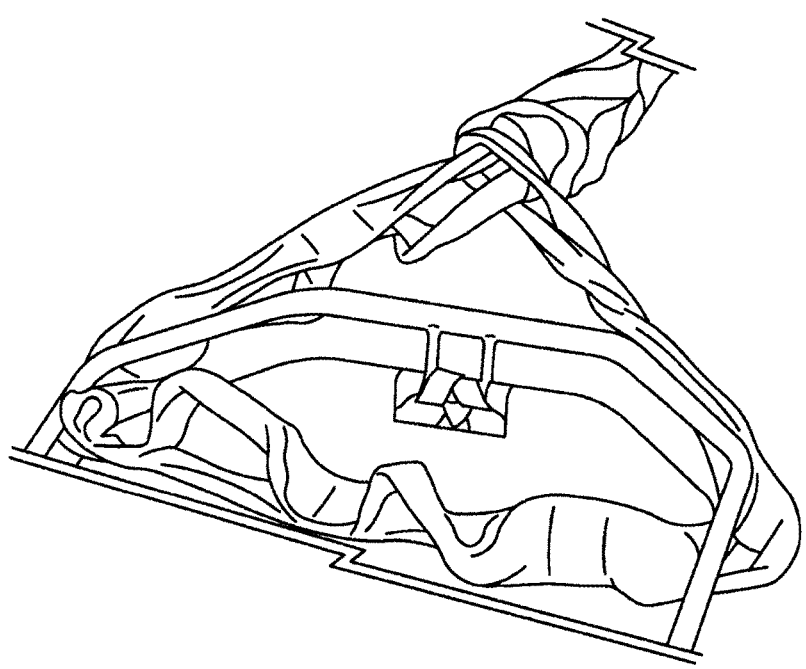

FIG. 12 shows the multi-purpose emergency services strap configured to drag a rescue basket or litter up an incline. The multi-purpose emergency services strap is inserted through splines at the head of the rescue basket. An end loop is doubled over to form a single line with loop at the end that is attached to the basket so that the basket can be dragged.

Figure 13:
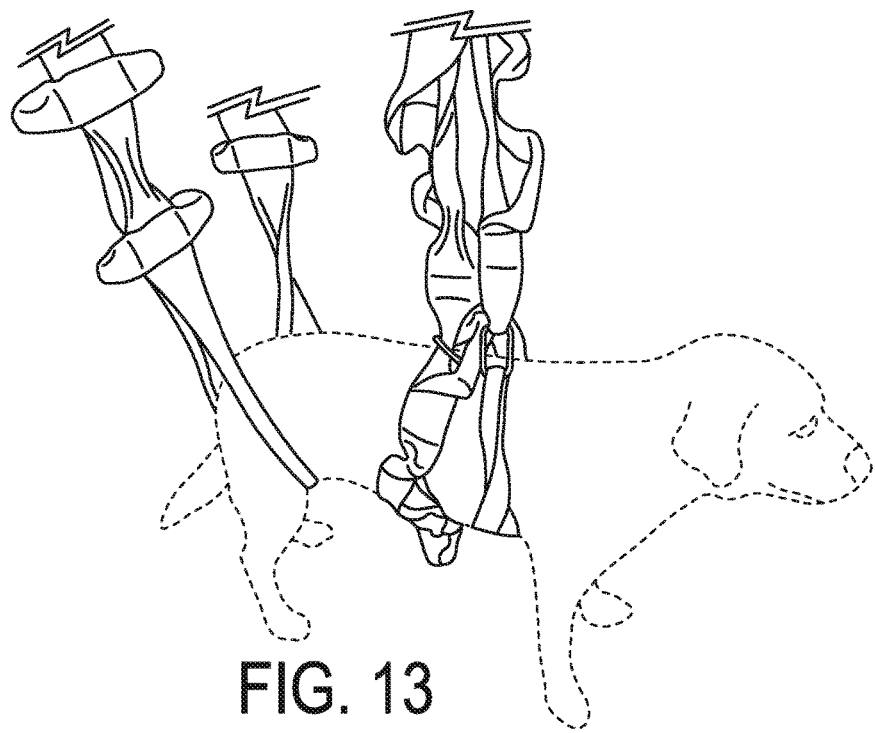

FIG. 13 shows the multi-purpose emergency services strap configured to lift a small animal such as a dog, sheep, goat, young deer, calf, pig, etc. The animal's rear legs are placed through the leg loops.

Figure 14:
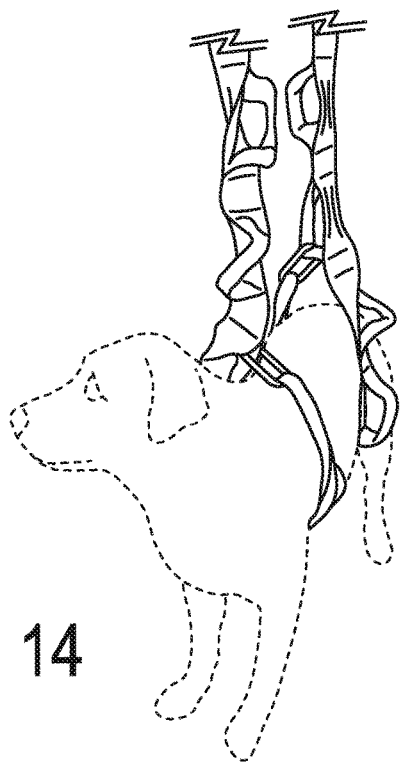
Figure 15:
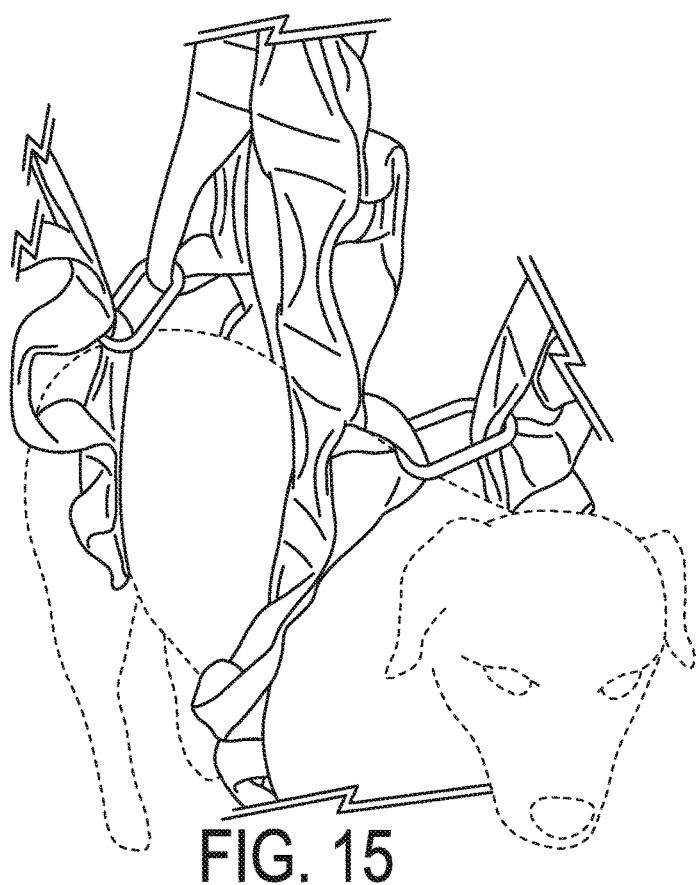

FIGS. 14 and 15 shows the multi-purpose emergency services strap in other configurations to lift a small animal. In these configurations, the rear legs are not placed through the leg loops.

Figure 16:
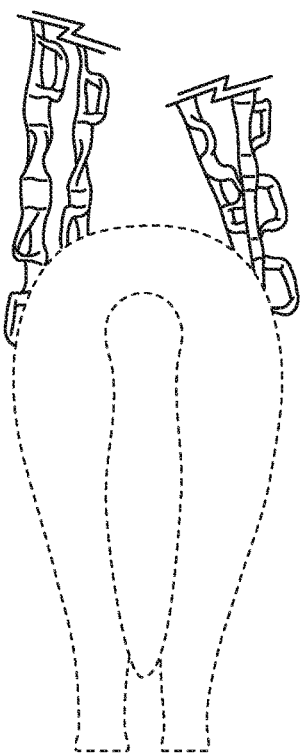

FIG. 16 shows the multi-purpose emergency services strap configured to lift a large animal such as a horse, cow or deer.

Figure 17:
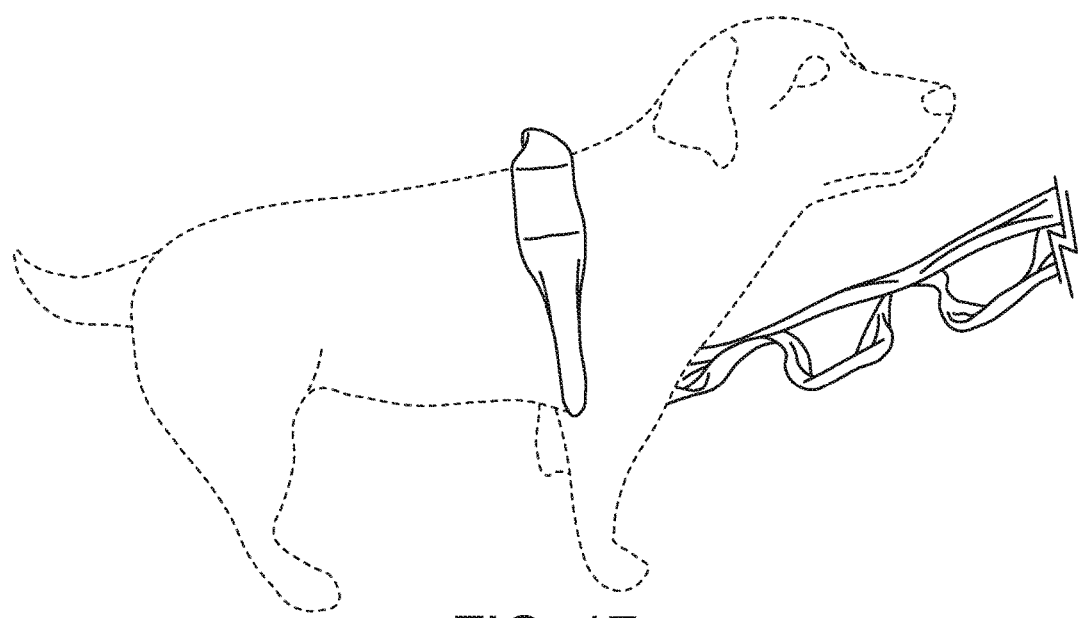
Figure 18:
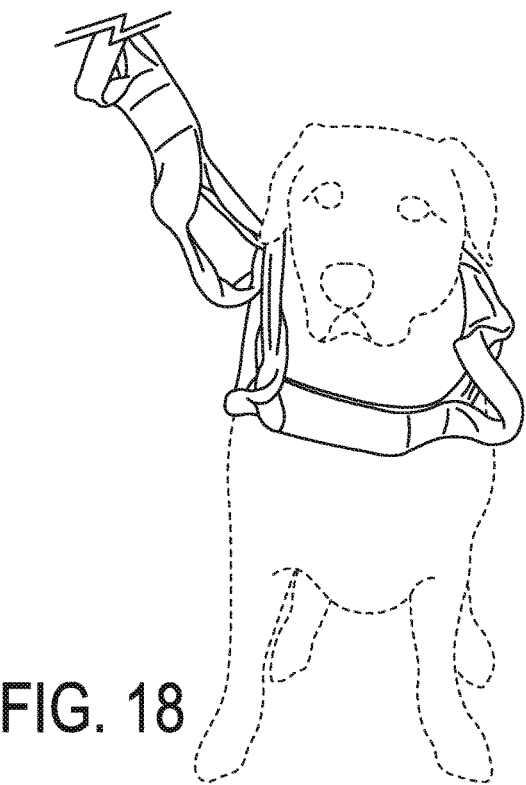

FIGS. 17 and 18 shows the multi-purpose emergency services strap in other configurations to pull small animals.

5. DETAILED DESCRIPTION OF THE INVENTION

A multi-purpose emergency services strap is provided for facilitating lifting, transporting or carrying an injured or incapacitated person (or animal) or a person (or animal) of interest for any reason that may be warranted by emergency services or assistance. The multi-purpose emergency services strap is adjustable in size and is quick and easy to fit to a person or animal. Different scaled sizes of the multi-purpose emergency services strap are also easily constructed according to methods known in the art.

The multi-purpose emergency services strap has two leg loops and a plurality of handles and attachment loops. The multi-purpose emergency services strap can be customized to fit many differently sized persons or animals by selecting the handles and/or attachment loops among the plurality of differently positioned handles and attachment loops, whereby emergency personnel can select the handles and attachment loops that are best positioned to support the incapacitated person to be lifted or transported. Furthermore, emergency personnel can easily discern the positions of handles and/or attachment loops in the multi-purpose emergency services strap that will best fit the incapacitated person whom they are assisting.

The multi-purpose emergency services strap is made of high strength polymer (e.g., polyester, nylon) webbing or rope, or some other suitable strong and lightweight woven or braided material. In one embodiment, the webbing has a working load limit equal to one-third the braking strength. In another embodiment, life safety rope can be braided and used. Life safety rope and its properties are well known in the art. The multi-purpose emergency services strap is constructed by looping and stitching webbing, rope or strap material for the purpose of making loops and handles (see, e.g., FIG. 10). In one embodiment, the stitching on the webbing has a SWL (safe working load) limit of 6,000-9,000 lbs. The multi-purpose emergency services strap thus becomes a multi-purpose tool for use by fire fighters, emergency medical technicians or other rescue personnel, which can be used in fire-fighting, rescue and other emergency situations. The multi-purpose emergency services strap can also be used for other applications that involve lifting or transferring humans or animals.

In various embodiments, the multi-purpose emergency services strap is foldable, is high strength but lightweight, and has a plurality of handles and attachment loops along its length. The plurality of handles and attachment loops can be used to encircle, hold or support the appendages of a human (2 arms and 2 legs) or an animal (e.g., with 2 fore limbs and 2 hind limbs). In other embodiments, the multi-purpose emergency services strap additionally comprises a back strap for supporting the back or spine of a human or animal.

The multi-purpose emergency services strap can be easily folded and carried by rescue personnel, for example, in a Rapid Intervention Bag or backpack, so that it is quickly and at all times available to aid in a variety of operations, including holding, supporting, rescue operations, and for use as a human body harness for guiding, sliding or supporting a person or animal. The multi-purpose emergency services strap is lightweight, durable, and inexpensive. It can be quickly and at all times available for use when and if an emergency or other situation develops in which support of a human or an animal is needed.

Methods for using the multi-purpose emergency services strap are also provided.

For clarity of disclosure, and not by way of limitation, the Detailed Description is divided into the subsections set forth below.

Multi-Purpose Emergency Services Strap

A multi-purpose emergency services strap is provided for facilitating lifting, transporting or carrying an individual. The multi-purpose emergency services strap has a strap body with a plurality of independent loops formed in the strap body. The independent loops comprise at least two adjacent leg loops formed in the strap body adjacent to, and on either side of, the midline of the strap body. The independent loops can also comprise end loops on each end of the multi-purpose emergency services strap, and a plurality of adjacent handles formed in the strap body positioned distal to each of the at least two adjacent, leg loops and proximal to the end loops. The multi-purpose emergency services strap also comprises, in embodiments, attachment loops and or a back strap that can be variously configured for many rescue and transport applications for humans and animals.

In one embodiment, a multi-purpose emergency services strap for facilitating lifting, transporting or carrying an individual of interest is provided, comprising a strap body, wherein the strap body comprises:
(a) at least two substantially inelastic, elongated strap portions of flexible, fabric-like, high-strength material, each strap portion comprising a first end, a second end opposite the first end, a strap running axis, a first edge running parallel to the running axis and a second edge running parallel to the running axis, wherein the at least two substantially inelastic, elongated strap portions are stitched together to form the strap body;
(b) a midline; and
(c) a plurality of independent loops, wherein:
    (i) each independent loop of the plurality is formed in the strap body by the at least two strap portions,
    (ii) opposed portions of each formed independent loop of the plurality are stitched together at a first point of formation on the strap body and at a second point of formation on the strap body opposite the first point of formation,
    (iii) the plurality of independent loops comprises:
        (a) at least two adjacent, leg loops formed in the strap body, wherein at least one of the at least two leg loops is positioned adjacent to the midline on a first side of the strap body, and at least one of the two leg loops is positioned adjacent to the midline on a second side opposite the first side of the strap body, and
        (b) a plurality of adjacent handles formed in the strap body positioned distal to each of the at least two adjacent, leg loops.

It will be apparent to the skilled artisan that the size dimensions for various elements of the multi-purpose emergency services strap can be varied so as to accommodate a variety of sizes, shapes and weights of individuals (human or other non-human animals) to be lifted or carried using the strap. In one embodiment, the leg loops are about 12 inches to 14 inches in diameter. In another embodiment, the legs loops are about 12.75 inches to 13.5 inches in diameter.

Threads that are suitable for stitching and sewing high strength straps are well known in the art. Suitable threads for use in stitching and sewing the multi-purpose emergency services strap include, but are not limited to, synthetic threads such as nylon threads or polyester threads. Such nylon or polyester threads can have melting points of not less than 400° F. Suitable threads for stitching can also allow for ease of inspection by the unaided eye with 20/20 vision at nominal distance of 305 mm (12 inches). In constructing the multi-purpose emergency services strap, all stitching breaks or ends may be backtacked not less than 13 mm (½ inch).

In a specific embodiment, #346 Eddington Polyester Bonded thread is used for stitching (Eddington Thread Manufacturing, Bensalem, Pa. 19020).

In certain embodiments, the thread sticks at 440° to 445° F. and melts at 483° F. The thread may have resistance to bleaches and other oxidizing agents. The thread may be insoluble or nearly insoluble.

For applications in which sunlight, bleach, and/or mildew resistance is especially desirable, polyester thread may be used.

The thread may be selected to have good resistance to most mineral acids and to weak alkalis, and to have resistance to strong alkalis at room temperature.

The thread may be selected to not be weakened by mildew and to have excellent resistance to aging, abrasion and degradation by exposure to sunlight.

If the thread is dyed, it may be selected as dyed with disperse developed and/or cationic dyes, dyed with a carrier, or dyed at high temperatures.

Strength of two pieces of webbing sewn together is determined by the number of stitches multiplied by the thread strength multiplied by the stitch factor, which, in one embodiment, is 1.5.

In a specific embodiment, the multi-purpose emergency services strap has 2 inch webbing and each approximately 2 inch by 2 inch area that is sewn has a strength rating of 6,000 lb. In another specific embodiment, the multi-purpose emergency services strap has 3-inch wide webbing and each approximately 2 inch by 3 inch area that is sewn has a strength rating over 9,000 lb.

The strength of the stitching can be increased by using a stronger thread. The strength of thread is easily determined by charts supplied by the thread manufacturer. See, for example, Eddington Thread Manufacturing Polyester Specification Sheet MIL SPEC MIL-DTL-32072(VT-285F) (http://www.eddingtonthread.com/polyester.html; last visited Feb. 18, 2015).

The leg loops can be sized to fit a variety of circumferences of human legs or animal limbs. In one embodiment, the legs loops are oversized to accommodate a wide range of leg circumferences. For example, under circumstances in which an incapacitated firefighter is lifted or transferred using the multi-purpose emergency services strap, the leg loops are sized to fit over the firefighter wearing "full turnout" firefighting gear.

In an embodiment, the openings of the handles are roughly rectangular, for example about 6 inches by about 2 inches for 2-inch wide or 3-inch wide webbing. In an embodiment, the handles are sized small enough to avoid catching on jagged edges of material that a person in a collapsed or burning building may have fallen through. If any smaller, two rescue personnel cannot both insert their hands into the handle at the same time.

In one embodiment, the distance between each handle is about two inches, so that the stitching forming the handles can attain a 6,000 lb. rating. In other embodiments, the distance between each handles is about 2 inches apart, since greater than 2 inch spacing will result in the handles being spaced too far apart, and less than 2 inch spacing means less stitches in the spacing, which will result in less strength.

At a distance of two inches apart, the handles are far enough apart to allow two rescue personnel to each reach their hand and arm down into a hole or inaccessible space and each grip a side of the handle with a hand. In one typical rescue scenario, two rescue personnel would be positioned on each of two opposite sides of a hole through which a person is to be rescued (2 pairs of rescue personnel or a total of 4 rescue personnel). Each pair of rescue personnel can reach hands and arms down into the hole and each pair will grip the two sides of the same handle. Thus the person to be transported by the multi-purpose emergency services strap will have 4 rescue personnel assisting in the lifting and transport using the multi-purpose emergency services strap.

In another embodiment, each of a pair of rescue personnel may grip a side of different handles, depending on the length of their arms and how far they can reach. Thus the handles of the multi-purpose emergency services strap can accommodate varying arm lengths in rescue personnel gripping the handles.

The loops in the multi-purpose emergency services strap can be, for example, double-sewn or triple-sewn lengthwise to meet the strength or rating requirements for a particular transport or rescue purpose. Such strength and/or rating requirements are well known in the art.

The multi-purpose emergency services strap is made of high strength polymer (e.g., polyester or nylon) webbing or some other suitable strong and lightweight webbing material. Strength and rating requirements for webbing for various uses is well known in the art. In certain embodiments, the webbing is about 1-4 inches in width.

For a multi-purpose emergency services strap to lift large (e.g., farm) animals, 4-inch webbing may be used. Smaller width webbing can be used for lighter loads such as humans and companion or small animals.

In another embodiment, the multi-purpose emergency services strap additionally comprises an independent back strap that is about 24 to 32 inches long comprising: a first end of the back strap, wherein the first end of the back strap comprises a first end loop of the back strap; a second end of the back strap, wherein the second end of the back strap comprises a second end loop of the back strap; and a back strap body portion therebetween. In another embodiment, the back strap is about 28-30 inches long. The back strap can be formed similar to the formation of the multi-purpose emergency services strap body portion, by double- or triple-folding and stitching polymer webbing or another suitable material. As with the multi-purpose emergency services strap body portion, in certain embodiments the webbing is about 2-3 inches in width. The back strap can be stiffened by inserting tubing or other stiffening material into the tube formed by the folding and stitching of the webbing. The back strap can have a ring, D-ring, snap link, quick link, clip or carabiner or other suitable type of fastener on one or both ends, associated with the end loops of the back strap.

In one embodiment, the multi-purpose emergency services strap further comprises at least one attachment loop for a ring, D-ring, snap link, quick link, clip, carabiner, or other suitable type of fastener positioned at a point of formation of a handle. In another embodiment, the multi-purpose emergency services strap further comprises at least two such attachment loops. In an embodiment in which the multi-purpose emergency services strap comprises at least two attachment loops, each positioned at a point of formation of a handle, the handles being on opposite sides of the midline. In such an embodiment, each end of the back strap can be clipped or otherwise attached to an attachment loop on either side of the midline, thus forming a back support for the multi-purpose emergency services strap.

The positioning of the leg loops, handles and back strap allow the rescued person to be supported by the multi-purpose emergency services strap and maintained in a position that avoids the head from hitting against the sides of the opening, hole or enclosed space from which they are being rescued.

Figure 1A:
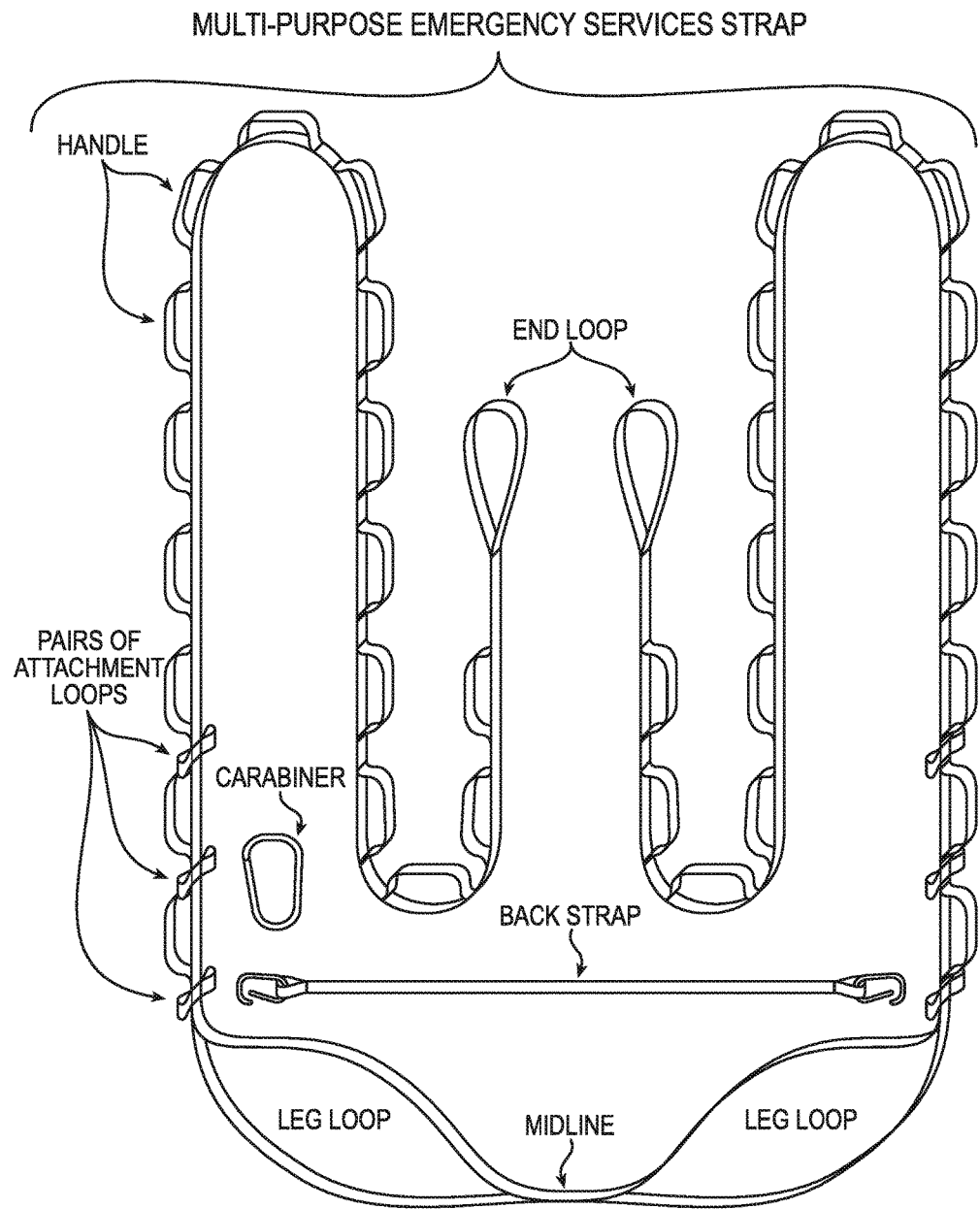
Figure 1B:
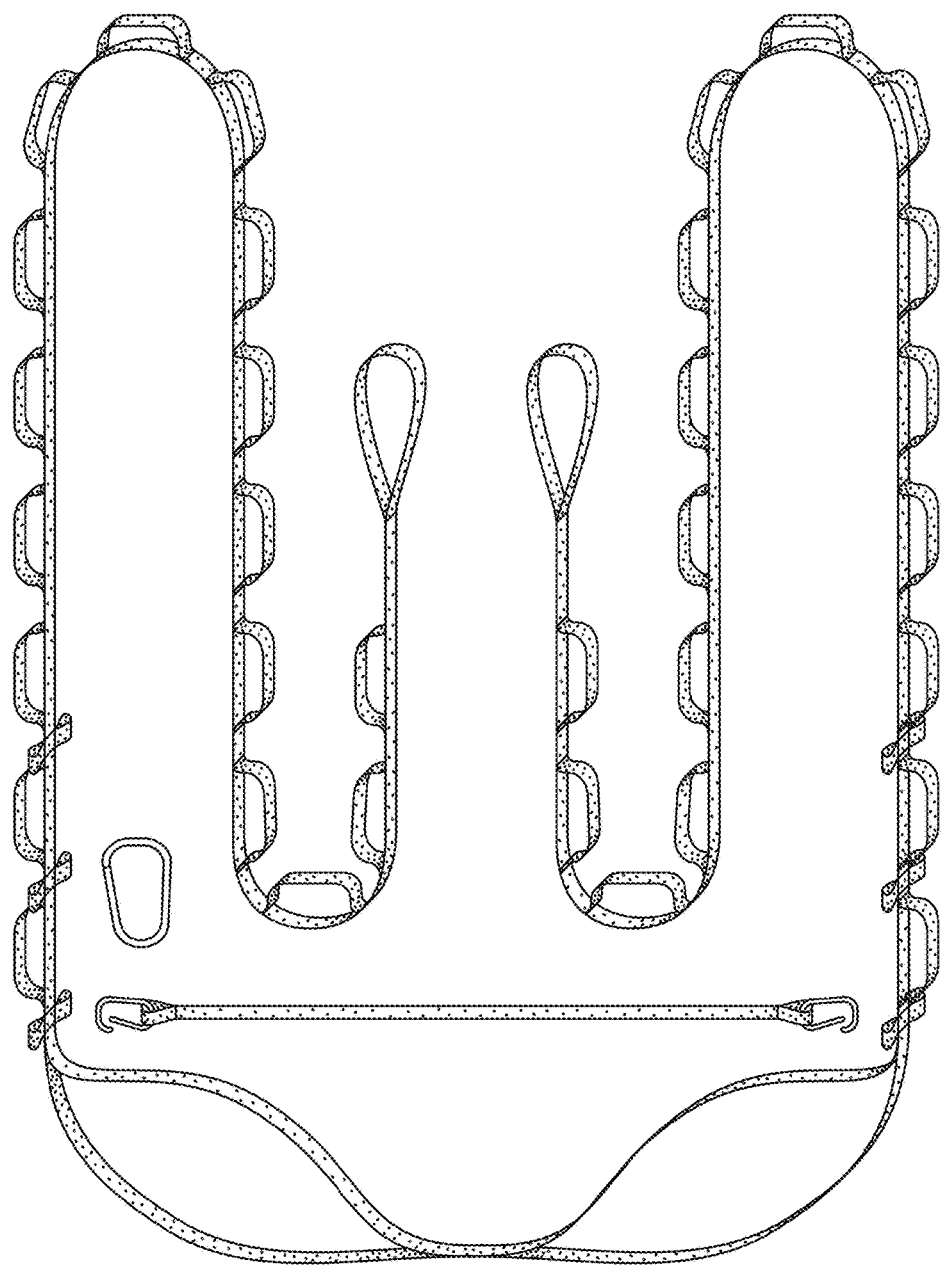

FIGS. 1A-1B show an exemplary embodiment of a multi-purpose emergency services strap. In the embodiment shown in FIG. 1A (front view), there are 17 handles and 3 pairs of attachment loops distal to each leg loop, which are positioned between the leg loop and the end loop on that side. This embodiment of the strap is about 29.5-30 feet long end-to-end.

Two approximately 2-foot long leg loops are formed on either side of the midline by stitching. For example, in one embodiment, an additional two parallel, 2-inch stretches of stitching along the midline, positioned between the two leg loops, forms the leg loops.

This embodiment also includes a back strap, which in this embodiment has a carabiner clipped onto each end. Any suitable fastener known in the art (e.g., ring, hook, D-ring, clip or carabiner) can be used. The fastener can be permanently affixed (e.g., sewn into) to the multi-purpose emergency services strap or to the back strap or the fastener can be removable.

In use, a carabiner, ring, hook, D-ring, or clip can be attached to an attachment loop and then attached to an opposite attachment loop to secure the multi-purpose emergency services strap in place. See also FIG. 3.

FIG. 1B shows a front view of the multi-purpose emergency services strap shown in FIG. 1A, with surface shading to show the character and contour of all surfaces of the three-dimensional aspects of the design.

Figure 2:
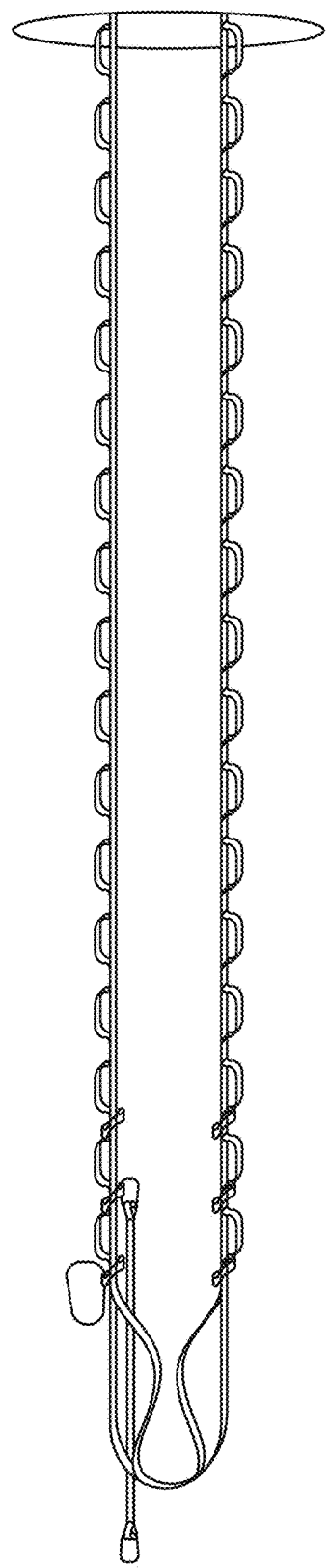

FIG. 2 is a left side view of the embodiment of the multi-purpose emergency services strap shown in FIGS. 1A-1B. This view shows the back strap and carabiner clipped to attachment loops. The right side view (not shown) of this embodiment would be a mirror image of this view.

Figure 3:
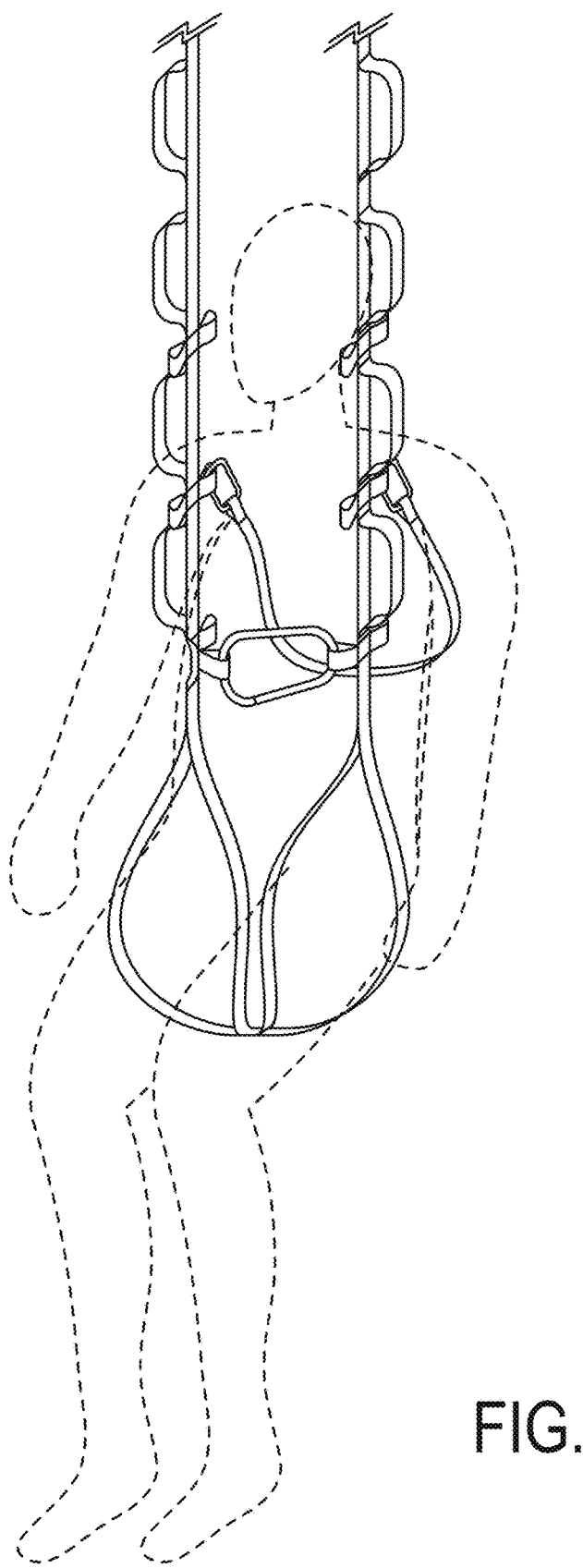
Figure 5:
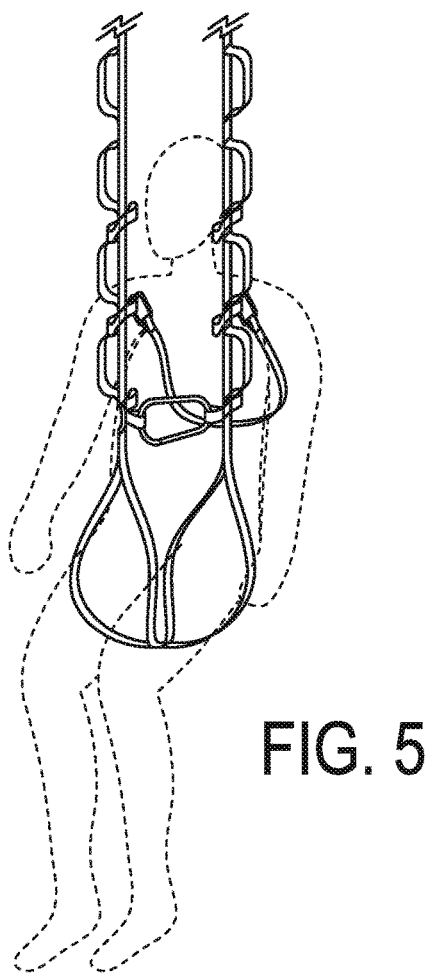
FIG. 5 is a photograph of the multi-purpose emergency services strap in use in a simulated emergency rescue of a person.

FIGS. 3 and 5 show use of embodiments of the multi-purpose emergency services strap for an emergency rescue of a person who has fallen into or become trapped in, for example, a hole or inaccessible area of a building. The leg loops of the multi-purpose emergency services strap placed around the legs of the person to be rescued. A carabiner clipped into one attachment loop and then clipped into an opposite attachment loop to secure the multi-purpose emergency services strap in place.

Rescuers or emergency services personnel can operate the multi-purpose emergency services strap by holding the end loops and distal handles of the strap. For example, two rescue workers can use the strap together, one worker assisting in the lifting on each end of the multi-purpose emergency services strap.

In another embodiment, four rescue workers can use the strap together, two workers assisting in the lifting on each end of the multi-purpose emergency services strap. The strap is thus useful in the lifting of heavy persons or animals, which may require the efforts of several rescue workers.

Figure 4:
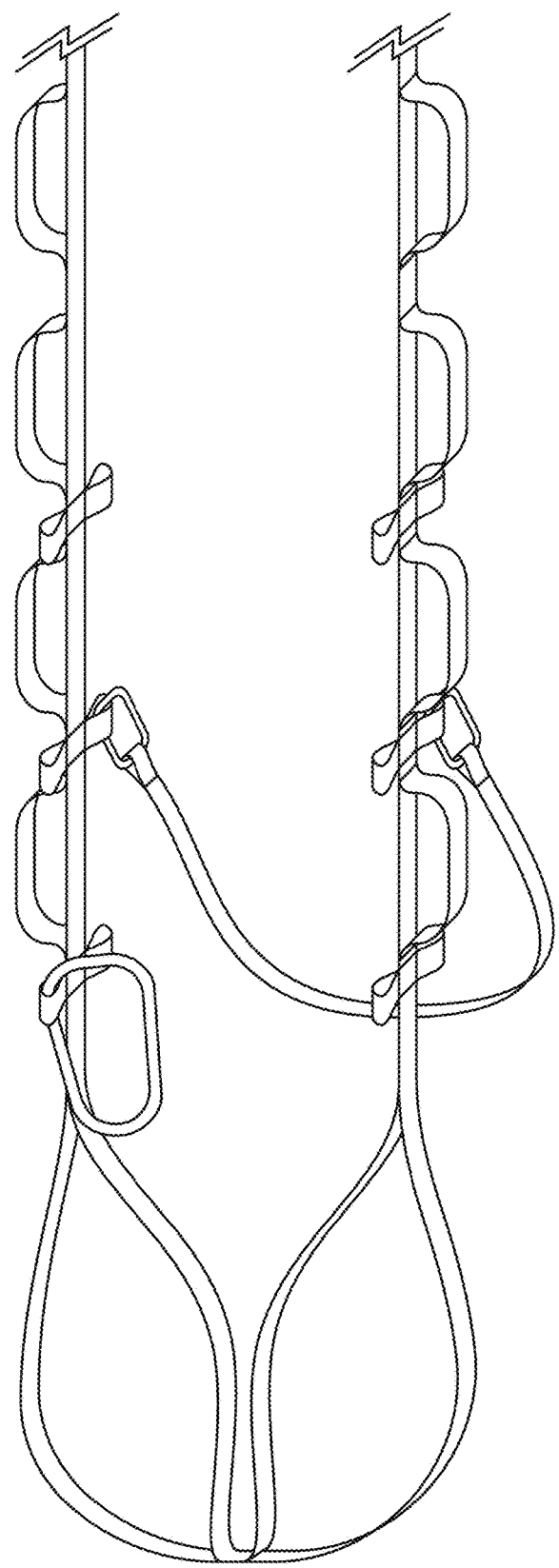
FIG. 4 shows an enlargement of the exemplary embodiment of the multi-purpose emergency services strap of FIG. 3, with the back strap clipped in place and before the carabiner (attached to one attachment loop) has been clipped to the opposite attachment loop.

FIG. 4 shows an enlargement of the embodiment of the multi-purpose emergency services strap of FIG. 3, before the carabiner has been clipped to the opposite attachment loop.

Figure 6:
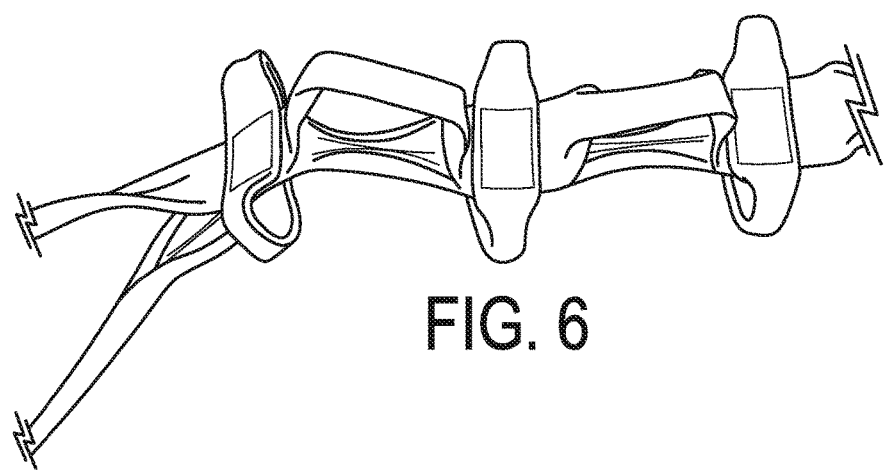
FIG. 6 shows an enlarged view of attachment loops of the multi-purpose emergency services strap. The attachment loops are positioned adjacent to the leg loops and the handles and are sewn in place.

FIG. 6 shows an enlarged view of the attachment loops of the multi-purpose emergency services strap shown in FIG. 3. The attachment loops are positioned adjacent to the leg loops and the handles and are sewn in place.

FIGS. 7 and 8 show two enlarged views of handles of two embodiments of the multi-purpose emergency services strap. The handle on the left side of each photo is made of webbing that is triple-folded over ("tripled over") and sewn. The handle on the right side of each photo is made of webbing that is double-folded over ("doubled over") and sewn. In these embodiments, the handle has one side longer ("long side") than the other side ("short side"). The long side of the handle is about 10 inches long and short side of the handle is about 6 inches long in these examples. Two inches of stitching is between the handles. These handles form approximately 6 inch by approximately 2 inch rectangles for 2-inch wide or 3-inch wide webbing.

In an embodiment, the two end loops are made of webbing that is tripled over and sewn. In other embodiments, webbing forming loops may be folded (doubled, tripled, quadrupled, or more) over to strengthen the webbing forming the loop. In an embodiment, the end loop is about 12 inches long when the loop is stretched flat. The webbing forming the loop is tripled over (⅓ of the width of the webbing) and sewn to form the loop. In an embodiment, the end loop is secured by about 6 inches of stitching.

FIG. 9 shows an enlarged view of a leg loop. In this embodiment, the webbing is sewn flat so that the handles, leg loops and end loops remain open, and will not flatten. Sewing the webbing flat makes using the handles or loops easier. The user or rescuer does not have to open the loop to insert or apply their hands or to double the end loop over. This ensures a better grip with gloves on. Also in this embodiment, the handles and the attachment loops are tripled (triple-folded) over and sewn all the way to the ends of the flaps or sections formed by the folded material (FIG. 9).

FIG. 10 shows a construction plan for sewing two pieces of webbing to form an embodiment of the multi-purpose emergency services strap. In this embodiment, the piece of webbing that forms the short side of each handle is doubled over at the ends to form end loops and connected to the second piece of webbing that forms the long side of the handles. It will be apparent to the skilled practitioner that there are numerous variations and modifications of this construction plan. For example, a single piece of webbing or at least 3 pieces of webbing could be sewn to form the end loops, handles and leg loops.

Methods for Using the Multi-Purpose Emergency Services Strap

The multi-purpose emergency services strap has many uses, as will be evident to one skilled in the arts of emergency rescue and transport of humans and/or animals. Methods for using the strap are also set forth in the Examples (Section 6) below.

A method for transporting (or moving or lifting) a human or animal in need of transporting (or moving or lifting) is provided. In an embodiment, the method comprises: providing the multi-purpose emergency services strap; placing the legs or hind limbs of the human or animal in the leg loops; fastening a ring, D-ring, clip or carabiner to two attachment loops across the ventral (belly or front portion) of the human or animal; positioning the back strap across the dorsal or back portion of the human or animal; and fastening the back strap to two attachment loops, thereby supporting the back or spine of the human or animal.

In an embodiment, the multi-purpose emergency services strap is used to lift, transport or remove individuals from holes, enclosed spaces or inaccessible spaces.

In another embodiment, the multi-purpose emergency services strap can be used, minus the back strap, as a rescue strap for a drowning person. The strap can be simply doubled and looped through, to form a large whole body circumference loop. The whole body circumference loop can be looped around the torso of the drowning person by a rescuer (who can, for example, swim to or reach out to the drowning person) and the drowning person can be pulled or dragged to safety. The user or rescuer inserts a hand through the end loop and grasps a handle to pull or drag.

In another embodiment, the multi-purpose emergency services strap can be used, minus the back strap, as a rescue strap to rescue a person who has fallen through ice into a body of water. The multi-purpose emergency services strap can be simply doubled and looped through, to form a large whole body circumference loop. The person who has fallen through the ice is instructed to insert their torso into the loop by the rescuer (who can, for example, throw or hand the multi-purpose emergency services strap to the person to be rescued) and the person who has fallen through ice can be pulled or dragged to safety.

In another embodiment, the multi-purpose emergency services strap can be used as a bridle to transport, in conjunction with an aerial rope system, a person in a rescue basket (e.g., Stokes rescue basket), cradle, spine board, rescue litter, splint stretcher, or other type of rescue stretcher. The multi-purpose emergency services strap is run through the foot end and head end of the slats or splines of the rescue stretcher (FIG. 11). The end loops are routed through the front corners of the basket and back to the strap handles. The strap is then inserted through a carabiner that is being used to lift the rescue basket. The strap is clipped in place and the basket is ready to be lifted.

In another embodiment, the multi-purpose emergency services strap can be used to drag a rescue basket or litter up an incline. The multi-purpose emergency services strap is inserted through splines at the head of the rescue basket. An end loop is doubled over to form a single line with loop at the end that is attached to the basket so that the basket can be dragged (FIG. 12).

It will be apparent to the skilled practitioner that the multi-purpose emergency services strap can be configured and adapted for many applications. A few examples of such applications are described in Section 6 (Examples).

6. EXAMPLES

6.1. Example 1

Lowering a Rescuer into a Hole, Vault, Well, Confined Space, Etc.

To rescue a victim at a lower level the rescuer needs access to the victim. If the only access is to be lowered the multi-purpose emergency services strap may be applied.

To apply the multi-purpose emergency services strap for lowering a rescuer:
1. Rescuer steps into leg loops and pulls leg loops up to groin area.
2. Rescuer holds onto handles on multi-purpose emergency services strap.
3. Rescuer is lowered to victim. If needed, the multi-purpose emergency services strap may be extended by attaching (using a carabiner) a second multi-purpose emergency services strap or Life Safety Rope.

Or:
1. Rescuer is placed in multi-purpose emergency services strap same as vertical lift:
   a. Step into leg loops.
   b. Attach a first pair of attachment loops (attachment loops #1) together with carabiner in front of rescuer.
   c. Attach back strap by connecting one end of back strap to a second attachment loop of a pair (attachment loop #2) with a carabiner; route back strap around back and connect to opposite side attachment loop #2 with carabiner.
   d. Rescuer is lowered to victim (advantage of this method is the rescuer's hands are free to guide through debris, etc.). If needed, the multi-purpose emergency services strap may be extended by attaching (using a carabiner) a second multi-purpose emergency services strap or Life Safety Rope.

6.2. Example 2

Lifting Vertically

Some examples of a vertical lift are:
1. Raising a victim (Firefighter or civilian) through a hole in a collapsed or burnt through floor, out of a vault, well, or any confined space below grade or any situation where a vertical lift is required.

To apply the multi-purpose emergency services strap vertically:
1. Lower the leg loops to the rescuer located with the victim keeping the end loops at the top of the hole, vault, well, etc.
2. Apply the leg loops to both legs by opening each leg loop and sliding it over each foot and continue all the way to the groin area.
3. In this embodiment, there are 3 sets (2 pairs each) of attachment loops that are optionally color-coded proximal (green), intermediate or middle (yellow), and distal (red) on the multi-purpose emergency services strap. The proximal (green) attachment loop pairs are positioned on either side of the midline closest to the leg loop on that side and closest to the midline. The distal (red) attachment loop pairs are positioned farthest from the leg loop on that side and farthest from the midline. The intermediate (yellow) attachment loop pairs are at an intermediate position between the proximal (green) attachment loop pairs and the distal (red) attachment lo op pairs. Attach corresponding proximal (green) attachment loops on either side of the midline to each other in front of the victim using a carabiner; these are the attachment loops closest to the leg loops.
4. Attach the proximal (green) attachment loops to each other in front of the victim using a carabiner; these are the attachment loops closest to the leg loops.
5. Using the supplied back strap connect one end of the back strap to an intermediate (yellow) attachment loop, route the strap around the victim's back, and connect the other end of the back strap to an intermediate (yellow) attachment loop on the opposite side. If the victim is extremely tall, the distal (red) attachment loops can be used in this step instead of the intermediate (yellow).
6. The rescuers lift the victim out using the handles on the strap. If needed, the multi-purpose emergency services strap may be extended by a second multi-purpose emergency services strap or Life Safety Rope.

Alternate methods apply to a Firefighter wearing a Self-Contained Breathing Apparatus (SCBA) besides steps 1-5 above. You may also:
1. Lower the leg loops to the rescuer located with the victim keeping the end loops at the top of the hole, vault, well, etc.
2. Apply the leg loops to both legs by opening each leg loop and sliding it over each foot and continue all the way to the groin area.
3. Pull each side of the multi-purpose emergency services strap tight and connect each side of the multi-purpose emergency services strap to each SCBA shoulder strap by placing a carabiner around the shoulder strap and connecting to a handle.
4. The rescuers lift the victim out using the handles on the strap. If needed, the multi-purpose emergency services strap may be extended by attaching (using a carabiner) a second multi-purpose emergency services strap or Life Safety Rope.

Or:
1. Lower the leg loops to the rescuer located with the victim keeping the end loops at the top of the hole, vault, well, etc.

2. Rescuer folds leg loops over on each other so he has the middle of the strap in his hands (middle of strap is stitching between leg loops).
3. Route the middle of multi-purpose emergency services strap under one shoulder strap, continue across the chest, under the other shoulder strap, and pull enough slack to reach the waist belt.
4. Disconnect waist belt and route one end of the waist belt through the multi-purpose emergency services strap loop that was created when the leg loops were folded over on itself.
5. Re-connect the waist belt and tighten.
6. The rescuers lift the victim out using the handles on the strap. If needed, the multi-purpose emergency services strap may be extended by attaching (using a carabiner) a second multi-purpose emergency services strap or Life Safety Rope.

Or:

1. Lower the leg loops to the rescuer located with the victim keeping the end loops at the top of the hole, vault, well, etc.
2. Rescuer folds leg loops over on each other, so the middle of the strap is in the hands (middle of strap is stitching between leg loops).
3. Route the middle of multi-purpose emergency services strap under one shoulder strap, continue across the chest, under the other shoulder strap, and pull enough slack to reach the waist belt.
4. Disconnect waist belt, route one end of the waist belt under the buttocks and back up through the groin area, and through the multi-purpose emergency services strap loop that was created when the leg loops were folded over on itself.
5. Re-connect the waist belt and tighten.
6. The rescuers lift the victim out using the handles on the strap. If needed, the multi-purpose emergency services strap may be extended by attaching (using a carabiner) a second multi-purpose emergency services strap or Life Safety Rope.

Or:

1. Lower the leg loops to the rescuer located with the victim keeping the end loops at the top of the hole, vault, well, etc.
2. Rescuer folds leg loops over on each other, so the middle of the strap is in the hands (middle of strap is stitching between leg loops).
3. Route the middle of multi-purpose emergency services strap under one shoulder strap, continue across the chest, under the other shoulder strap, and pull enough slack to reach the victim's feet.
4. Apply the leg loops to both legs by opening each leg loop and sliding it over each foot and continue all the way to the groin area.
5. Pull excess slack back through SCBA shoulder straps.
6. The rescuers lift the victim out using the handles on the strap. If needed, the multi-purpose emergency services strap may be extended by attaching (using a carabiner) a second multi-purpose emergency services strap or Life Safety Rope.

6.3. Example 3

Horizontal Drag

A horizontal drag could be necessary rescuing a large victim, a victim in obstacles such as debris, a victim in tight spaces, or any other situation where a drag requires assistance. To apply the multi-purpose emergency services strap for a horizontal drag:

1. Apply the leg loops to both legs by opening each leg loop and sliding it over each foot and continue all the way to the groin area.
2. There are 3 sets of attachment loops optionally color coded proximal (green), middle or intermediate (yellow), and distal (red). Attach the proximal (green) attachment loops to each other on the side of the victim that is closest to the floor using a carabiner. If you are dragging a victim lying face down, connect proximal (green) to proximal (green) on the front (abdomen) side of victim. If a victim is lying face up, connect proximal (green) to proximal (green) on back (buttocks) side of victim.
3. Using the supplied back strap, connect one end of the back strap to an intermediate (yellow) attachment loop, route the strap across the floor and connect the other end of the back strap to an intermediate (yellow) attachment loop on the opposite side. The back strap should be located between the victim and the floor. If the victim is extremely tall use the distal (red) attachment loops in this step instead of the intermediate (yellow) loops.
4. Rescuer(s) drag the victim using the handles on the multi-purpose emergency services strap. If needed, the multi-purpose emergency services strap may be extended by attaching (using a carabiner) a second multi-purpose emergency services strap or Life Safety Rope.

6.4. Example 4

Water Rescue

The multi-purpose emergency services strap may be used for water rescue. To apply the multi-purpose emergency services strap for water rescue:

1. Fold an end loop over the strap and feed the multi-purpose emergency services strap through it making a big loop (large enough to fit around the victim).
2. Throw the multi-purpose emergency services strap to the victim (the large loop you just made goes to the victim) holding on to the opposite end.
3. Instruct the victim to place the loop over the head and shoulders putting arms through.
4. Shake the multi-purpose emergency services strap and it will tighten down on the victim.
5. Pull victim to safety by using the handles on the multi-purpose emergency services strap. If needed, the multi-purpose emergency services strap may be extended by attaching (using a carabiner) a second multi-purpose emergency services strap or Life Safety Rope.

Or:

1. Fold an end loop over the strap and feed the multi-purpose emergency services strap through it making a big loop (large enough to fit around the victim).
2. Rescuer takes large loop and swims to victim from behind and places multi-purpose emergency services strap over victim's head and shoulders and under the arms, then releases the multi-purpose emergency services strap (and victim).
3. Rescuers on land shake multi-purpose emergency services strap to tighten down on victim and pull victim to safety using handles on the multi-purpose emergency services strap. If needed, the multi-purpose emergency services strap may be extended by attaching (using a carabiner) a second multi-purpose emergency services strap or Life Safety Rope.

6.5. Example 5

Ice Rescue

The multi-purpose emergency services strap may be used for Ice Rescue. To apply the multi-purpose emergency services strap for Ice Rescue:
1. Fold an end loop over the strap and feed the multi-purpose emergency services strap through it making a big loop (large enough to fit around the victim).
2. Throw the multi-purpose emergency services strap to the victim (the large loop you just made goes to the victim) holding on to the opposite end.
3. Instruct the victim to place the loop over the head and shoulders putting arms through.
4. Shake the multi-purpose emergency services strap and it will tighten down on the victim.
5. Pull victim to safety by using the handles on the multi-purpose emergency services strap. If needed, the multi-purpose emergency services strap may be extended by attaching (using a carabiner) a second multi-purpose emergency services strap or Life Safety Rope.

Or:
1. Fold an end loop over the strap and feed the multi-purpose emergency services strap through it making a big loop (large enough to fit around the victim).
2. Rescuer takes large loop and swims to victim from behind, places multi-purpose emergency services strap over victims head and shoulders under the arms and releases the multi-purpose emergency services strap (and victim).
3. Rescuers on land shake multi-purpose emergency services strap to tighten down on victim and pull victim to safety using handles on the multi-purpose emergency services strap.
4. If needed, the multi-purpose emergency services strap may be extended by attaching (using a carabiner) a second multi-purpose emergency services strap or Life Safety Rope.

6.6. Example 6

Bridle for Stokes Basket (Litter)

The multi-purpose emergency services strap may be used as a Multiple Configuration Load Strap to vertically raise or lower a litter. To apply the multi-purpose emergency services strap as a Multiple Configuration Load Strap:
1. Feed an end loop through the foot end of a litter from one side through the other until the middle of the multi-purpose emergency services strap (the leg loops) is centered in the litter.
2. Take both end loops and feed them through a carabiner which hangs from the lifting device (Rope system, anchor straps on aerial device, etc.).
3. Take end loops and pass them through their respective corners of the litter frame on the head end and back up toward the carabiner they were passed through.
4. When the straps tighten up, secure the end loops to the closest handles with carabiners.
5. To elevate the head of the litter, disconnect end loops, raise end loops number of handles desired for height, re-secure end loops to closest handles with carabiners.
6. To Lower the head of the litter, disconnect end loops, lower end loops number of handles desired, re-secure end loops to closest handles with carabiners.
7. After height has been adjusted, lock the closest handle in the carabiner hanging from the lifting device.

6.7. Example 7

End to End Load Strap

The multi-purpose emergency services strap may be used as an anchor strap for life safety rope systems, a vertical lift strap to raise a litter end to end, low angle raise or lower for a litter, etc. To apply the multi-purpose emergency services strap as an End-to-End Load Strap:
1. Anchor Strap: Place the multi-purpose emergency services strap around an anchor and connect the end loops with a carabiner. The advantage of the multi-purpose emergency services strap is its length; it will go around larger anchors for life safety rope systems.
2. Vertical Lift Strap: Connect the end loops to the corners on the head end of a litter and fasten the lifting device to the middle of the multi-purpose emergency services strap (in between the leg loops) using a carabiner.
3. Low angle raise or lower for a litter:
    A. Low angle single line: Feed an end loop from one corner to the other on the head end of the litter and then back to the strap and secure with a carabiner. This allows 30 feet of handles to raise or lower on grades.
    B. Low angle double line: Connect the end loops to the corners on the head end of a litter. This allows 2 rows of handles 15 feet long allowing more personnel to raise or lower on grades.

6.8. Example 8

Lowering a Victim

The multi-purpose emergency services strap may be used to lower a victim from an elevated height such as an upper story window, a stairwell or floor that is burnt-out or compromised, a roof, etc. To apply the multi-purpose emergency services strap for lowering a victim:
1. Out of a window:
    A. Apply the leg loops to both legs by opening each leg loop and sliding it over each foot and continue all the way to the groin area.
    B. In this embodiment, there are 3 sets (2 pairs each) of attachment loops that are optionally color-coded proximal (green), middle or intermediate (yellow), and distal (red) on the multi-purpose emergency services strap. The proximal (green) attachment loop pairs are positioned on either side of the midline closest to the leg loop on that side and closest to the midline. The distal (red) attachment loop pairs are positioned farthest from the leg loop on that side and farthest from the midline. The intermediate (yellow) attachment loop pairs are at an intermediate position between the proximal (green) attachment loop pairs and the distal (red) attachment loop pairs. Attach corresponding proximal (green) attachment loops on either side of the midline to each other in front of the victim using a carabiner; these are the attachment loops closest to the leg loops.

C. Using the supplied back strap, connect one end of the back strap to an intermediate (yellow) attachment loop, route the strap around the victim's back, and connect the other end of the back strap to a corresponding intermediate (yellow) attachment loop on the opposite side. If the victim is extremely tall, use the distal (red) attachment loops (farthest from the midline) in this step instead of the intermediate (yellow) attachment loops.

D. The rescuers lift the victim out the window, feet first, face down, lowering the victim using the handles on the multi-purpose emergency services strap. If needed, the multi-purpose emergency services strap may be extended by attaching (using a carabiner) a second multi-purpose emergency services strap or Life Safety Rope.

2. Stairwell or floor that is compromised, or a roof:

A. Apply the leg loops to both legs by opening each leg loop and sliding it over each foot and continue all the way to the groin area.

B. As in the example described above, there are 3 sets (2 pairs each) of attachment loops optionally color coded proximal (green), middle or intermediate (yellow), and distal (red) on the multi-purpose emergency services strap. The proximal (green) attachment loop pairs are positioned on either side of the midline closest to the leg loop on that side and closest to the midline. The distal (red) attachment loop pairs are positioned farthest from the leg loop on that side and farthest from the midline. The intermediate (yellow) attachment loop pairs are at an intermediate position between the proximal (green) attachment loop pairs and the distal (red) attachment loop pairs. Attach corresponding proximal (green) attachment loops on either side of the midline to each other in front of the victim using a carabiner; these are the attachment loops closest to the leg loops.

C. Using the supplied back strap connect one end of the back strap to an intermediate (yellow) attachment loop, route the strap around the victim's back, and connect the other end of the back strap to a corresponding intermediate (yellow) attachment loop on the opposite side. If the victim is extremely tall, use the distal (red) attachment loops (farthest from the midline) in this step instead of the intermediate (yellow) attachment loops.

D. The rescuer(s) slide the victim to the edge of the hole or roof feet first, face down, lowering the victim using the handles on the multi-purpose emergency services strap. If needed, the multi-purpose emergency services strap may be extended by attaching (using a carabiner) a second multi-purpose emergency services strap or Life Safety Rope.

6.9. Example 9

Emergency Medical Services (EMS)

The multi-purpose emergency services strap may be used to lift patients to their feet, including, but not limited to: geriatric patients experiencing pain when picked up under the arm pits; bariatric patients who are too large to pick up under the arms; and patients in general who have fallen and cannot get up, but are not injured.

In addition to the multi-purpose emergency services strap being used by Fire/EMS personnel, it can also be used in a hospital or rehabilitation center setting, or by ambulance personnel to lift patients.

To apply the multi-purpose emergency services strap to an EMS patient that does not require stabilization:

1. Apply the leg loops to both legs by opening each leg loop and sliding it over each foot and continue all the way to the groin area.
2. There are 3 sets of attachment loops optionally color coded proximal (green), middle or intermediate (yellow), and distal (red) as described in Example 8 in Section 6.8. The proximal (green) attachment loop pairs are positioned on either side of the midline closest to the leg loop on that side and closest to the midline. The distal (red) attachment loop pairs are positioned farthest from the leg loop on that side and farthest from the midline. The intermediate (yellow) attachment loop pairs are at an intermediate position between the proximal (green) attachment loop pairs and the distal (red) attachment loop pairs. Attach the proximal (green) attachment loops to each other in back of the victim using a carabiner; these are the attachment loops closest to the leg loops.
3. Using the supplied back strap connect one end of the back strap to an intermediate (yellow) attachment loop, route the strap around the victim's chest, and connect the other end of the back strap to an intermediate (yellow) attachment loop on the opposite side. If the victim is extremely tall use the distal (red) attachment loops in this step instead of the intermediate (yellow).
4. Lift the patient to their feet using the handles on the multi-purpose emergency services strap. The handles make it easy for the user to use the user's legs to lift instead of his or her back.

6.10. Example 10

Applications for Animals

Examples are given for using the multi-purpose emergency services strap in the rescue or lifting of animals who find themselves in an emergency situation, such as stuck in mud, earth, or debris, fallen into a space or hole that animal cannot get itself out of, veterinary services (both emergency and non-emergency), or any situation in which an animal needs to be lifted or pulled.

To apply the multi-purpose emergency services strap to a small animal such as a dog, sheep, goat, young deer, calf, pig, etc. (FIG. 13):

1. Place rear legs through the leg loops.
2. Take one end loop and go under the chest just in back of the front shoulders.
3. Bring the end loop up to the top of the back and connect it to the closest handle with a carabiner (you just made a loop around the chest).
4. Do the same with the other end loop from the opposite direction using the same carabiner in step 3 to make the connection. You should have two handles and two end loops in one carabiner.
5. Use the handles of the multi-purpose emergency services strap or a lifting device to lift the animal.

If the animal will not permit you to put the leg loops on (thrashing, skittish, resistant), use the following procedure (FIG. 14):

1. Take one end loop and go under the abdomen just in front of the hind legs.

2. Bring the end loop up to the top of the back and connect it to the closest handle with a carabiner (you just made a loop around the abdomen).
3. Take the other end loop and go under the chest just in back of the front shoulders.
4. Bring the end loop up to the top of the back and connect it to the closest handle with a carabiner (you just made a loop around the chest).
5. Use the handles of the multi-purpose emergency services strap or a lifting device to lift the animal.

Or (FIG. 15):
1. Connect the two end loops with a carabiner (now the strap is one continuous loop).
2. Pass the carabiner under the animal.
3. Bring the carabiner up to the top of the back.
4. Bring the middle of the leg loops (midline of strap) up to the top of the back.
5. Take slack out of strap and connect handle to handle front and handle to handle rear.
6. Adjust the multi-purpose emergency services strap so it remains just behind the front legs and just in front of the hind legs.
7. Use the handles of the multi-purpose emergency services strap or a lifting device to raise the animal.

To apply the multi-purpose emergency services strap to a large animal such as a deer, cow, horse, etc. (FIG. 16):
1. Take one end loop and go under the abdomen just in front of the hind legs
2. Bring the end loop up to the top of the back and connect it to the closest handle with a carabiner (you just made a loop around the abdomen).
3. Take the other end loop and go under the chest just in back of the front shoulders.
4. Bring the end loop up to the top of the back and connect it to the closest handle with a carabiner (you just made a loop around the chest).
5. Connect the multi-purpose emergency services strap to a lifting device such as a tractor, crane, or lift to raise the animal.

If the animal will not permit you to get near it, use the following procedure (FIGS. 15 and 16):
1. Connect the two end loops with a carabiner (now the strap is one continuous loop).
2. Pass the carabiner under the animal.
3. Bring the carabiner up and connect to the lifting device, crane, tractor, etc.
4. Bring the middle of the leg loops (midline of strap) up and connect to the lifting device, crane, tractor, etc. with a carabiner (make sure the carabiner is around the strap and not in a leg loop).
5. Take slack out of strap and connect handle to handle front and handle to handle rear.
6. Adjust the multi-purpose emergency services strap so it remains just behind the front legs and just in front of the hind legs.
7. Use the lifting device to raise the animal.

If the animal is in water, through the ice, or you can't get the strap around the animal to lift, and need to pull (FIG. 17):
1. Approach animal from the front and route end loop of strap between front legs, up one side, over the back, and down the other side.
2. Connect end loop to closest handle of strap making the strap as tight as possible (you just made a loop around the torso).
3. Pull animal to safety.

OR (FIG. 18):
1. Fold an end loop over the strap and feed the multi-purpose emergency services strap through it making a big loop (large enough to fit around the animal).
2. Rescuer takes large loop and places it over the animal's head as far down as possible and lets go.
3. Rescuers on land shake multi-purpose emergency services strap to tighten down on the animal.
4. Rescuers pull animal to safety using handles on the multi-purpose emergency services strap or a pulling device.
5. If needed, the multi-purpose emergency services strap may be extended by attaching (using e.g., a carabiner) a second multi-purpose emergency services strap or Life Safety Rope.

6.11. Example 11

Exemplary Dimensions of One Embodiment of Multi-Purpose Emergency Services Strap This is an example describing the dimensions and construction of an exemplary embodiment of the multi-purpose emergency services strap. The starting length of the strap material used for construction of the multi-purpose emergency services strap is initially about 30 feet long. The handles and loops are tripled over and sewn. The midline is sewn together to form the leg loops. The stitching is about 2 inches wide on the midline. The leg loops measure about 21.5 inches long and are about 13.5 inches in diameter (when the leg loop forms a circle). In another embodiment, each leg loop is sewn to be about 24 inches long and the diameter of a circle formed from the leg loop about 24 inches long is about 15.25 inches.

In this embodiment, there is about 2 inches between handles. One side (the "short" side) of a handle is about 6 inches long and the other side (the "long" side) is about 10 inches long. In this embodiment, the final handle shape is approximately rectangular, measuring 6 inches by 2 inches. The back strap measures 28-30 inches long.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

While embodiments of the present disclosure have been particularly shown and described with reference to certain examples and features, it will be understood by one skilled in the art that various changes in detail may be effected therein without departing from the spirit and scope of the present disclosure as defined by claims that can be supported by the written description and drawings. Further, where exemplary embodiments are described with reference to a certain number of elements it will be understood that the exemplary embodiments can be practiced utilizing either less than or more than the certain number of elements.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A multi-purpose emergency services strap for facilitating lifting, transporting or carrying an individual of interest, comprising a strap body, wherein the strap body comprises:
    (a) at least two substantially inelastic, elongated strap portions of flexible, fabric, high-strength material, each of the strap portions comprising a first end, a second end opposite the first end, a strap running axis, a first edge running parallel to the running axis and a second edge running parallel to the running axis, wherein the at least two substantially inelastic, elongated strap portions are stitched together to form the strap body;
    (b) a midline;
    (c) a plurality of independent loops, wherein:
        (i) each of the independent loops is formed in the strap body by the at least two strap portions,
        (ii) opposed portions of each of the independent loops are stitched together at a first point of formation on the strap body and at a second point of formation on the strap body opposite the first point of formation,
        (iii) the plurality of independent loops comprises:
            at least two adjacent, leg loops formed in the strap body, wherein at least one of the at least two leg loops is positioned adjacent to the midline on a first side of the strap body, and at least one of the two leg loops is positioned adjacent to the midline on a second side opposite the first side of the strap body, and
            a plurality of adjacent handles formed in the strap body positioned distal to each of the at least two adjacent, leg loops; and
    (d) an independent back strap comprising:
        a first end of the back strap, wherein the first end of the back strap comprises a first end loop or fasting point of the back strap;
        a second end of the back strap, wherein the second end of the back strap comprises a second end loop or fasting point of the back strap; and
        a back strap body portion therebetween.

2. The multi-purpose emergency services strap of claim 1 further comprising an end loop positioned at at least one of the first end and the second end.

3. The multi-purpose emergency services strap of claim 1 wherein the at least two leg loops are capable of encircling, holding or lifting the legs of the individual.

4. The multi-purpose emergency services strap of claim 1 wherein the at least two substantially inelastic, elongated strap portions are portions of one strap and wherein an end of each strap body portion is folded back and stitched to form the strap body portion therebetween.

5. The multi-purpose emergency services strap of claim 1, further comprising at least one attachment loop at a point of formation of a handle.

6. The multi-purpose emergency services strap of claim 1, further comprising at least one pair of attachment loops positioned at a point of formation of a handle.

7. The multi-purpose emergency services strap of claim 6, comprising 3 pairs of attachment loops on either side of the midline, wherein each pair is positioned at a point of formation of a handle.

8. The multi-purpose emergency services strap of claim 1, further comprising a ring, D-ring, clip or carabiner attached to one of the attachment loops.

9. The multi-purpose emergency services strap of claim 1, further comprising an attachment loop for a ring, D-ring, clip or carabiner positioned at a point of formation of a second handle adjacent to the first handle.

10. The multi-purpose emergency services strap of claim 1 wherein at least one of the first end of the back strap and the second end of the back strap is folded back on the back strap and stitched to the back strap to form at least one of the first end loop of the back strap and the second end loop of the back strap.

11. The multi-purpose emergency services strap of claim 10 wherein at least one of the first and second end loops of the back strap comprises an attached ring, D-ring, clip or carabiner.

12. A method for transporting by moving or lifting a human or animal in need of transporting comprising:
    providing a multi-purpose emergency services strap of claim 1;
    placing the legs or hind limbs of the human or animal in the leg loops;
    fastening a ring, D-ring, clip or carabiner to two attachment loops across the ventral belly or front portion of the human or animal;
    positioning the back strap across the dorsal or back portion of the human or animal; and
    fastening the back strap to two attachment loops, thereby supporting the back or spine of the human or animal.

* * * * *

UNITED STATES PATENT AND TRADEMARK OFFICE
CERTIFICATE OF CORRECTION

PATENT NO. : 9,764,930 B2  
APPLICATION NO. : 15/132872  
DATED : September 19, 2017  
INVENTOR(S) : Mark Schroeder It is certified that error appears in the above-identified patent and that said Letters Patent is hereby corrected as shown below:

In the Claims

Column 21, Claim number 1, Line 35, delete "fasting" and replace with "fastening".

Column 21, Claim number 1, Line 39, delete "fasting" and replace with "fastening".

Signed and Sealed this  
Eighth Day of May, 2018

Andrei Iancu  
*Director of the United States Patent and Trademark Office*